(12) United States Patent
Hashimoto et al.

(10) Patent No.: US 10,530,269 B2
(45) Date of Patent: Jan. 7, 2020

(54) AC-DC CONVERTER

(71) Applicant: PANASONIC INTELLECTUAL PROPERTY MANAGEMENT CO., LTD., Osaka (JP)

(72) Inventors: Takao Hashimoto, Osaka (JP); Takuya Ishii, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 16/455,623

(22) Filed: Jun. 27, 2019

(65) Prior Publication Data

US 2019/0326829 A1 Oct. 24, 2019

Related U.S. Application Data

(63) Continuation of application No. PCT/JP2017/046279, filed on Dec. 25, 2017.

(30) Foreign Application Priority Data

Jan. 6, 2017 (JP) .................................. 2017-001353

(51) Int. Cl.
*H02M 7/00* (2006.01)
*H02M 7/06* (2006.01)
*H02M 7/217* (2006.01)

(52) U.S. Cl.
CPC ........... *H02M 7/062* (2013.01); *H02M 7/217* (2013.01)

(58) Field of Classification Search
CPC .............................. H02M 7/062; H02M 7/217
See application file for complete search history.

(56) References Cited

U.S. PATENT DOCUMENTS

2006/0274468 A1* 12/2006 Phadke .................. H02H 9/001
361/93.1

FOREIGN PATENT DOCUMENTS

JP     H08-126331 A    5/1996
JP     H10-155272 A    6/1998
(Continued)

OTHER PUBLICATIONS

International Search Report and Written Opinion dated Feb. 20, 2018 in International (PCT) Application No. PCT/JP2017/046279; with partial English translation.

*Primary Examiner* — Adolf D Berhane
*Assistant Examiner* — Afework S Demisse
(74) *Attorney, Agent, or Firm* — McDermott Will & Emery LLP (57) ABSTRACT

An alternating current-direct current (AC-DC) converter includes: an input AC power supply that outputs an input AC voltage; a step-up converter that converts the input AC voltage into an output DC voltage to be outputted from an output capacitor; and an inrush current suppressing circuit. The inrush current suppressing circuit includes: an inrush current suppressing resistor provided on a path through which a current from the input AC power supply flows to charge the output capacitor and returns to the input AC power supply; a resistance short-circuiting switch that short-circuits the inrush current suppressing resistor; and a control circuit that generates a signal for turning off the resistance short-circuiting switch when an absolute value of the input AC voltage is higher than the output DC voltage.

7 Claims, 9 Drawing Sheets

(56) References Cited

FOREIGN PATENT DOCUMENTS

| JP | 2005-295649 A | 10/2005 |
|---|---|---|
| JP | 4288702 B2 | 7/2009 |

\* cited by examiner

FIG. 9 ical Field

The present disclosure relates to an alternating current-direct current (AC-DC) converter including an inrush current suppressing circuit.

2. Description of the Related Art

Various inrush current suppressing circuits in step-up switching AC-DC converters are proposed. Japanese Unexamined Patent Application Publication No. 8-126331 (Hereinafter, will be referred to as PLT1) describes an example of an inrush current suppressing circuit having a simple circuit configuration.

Figure 9:
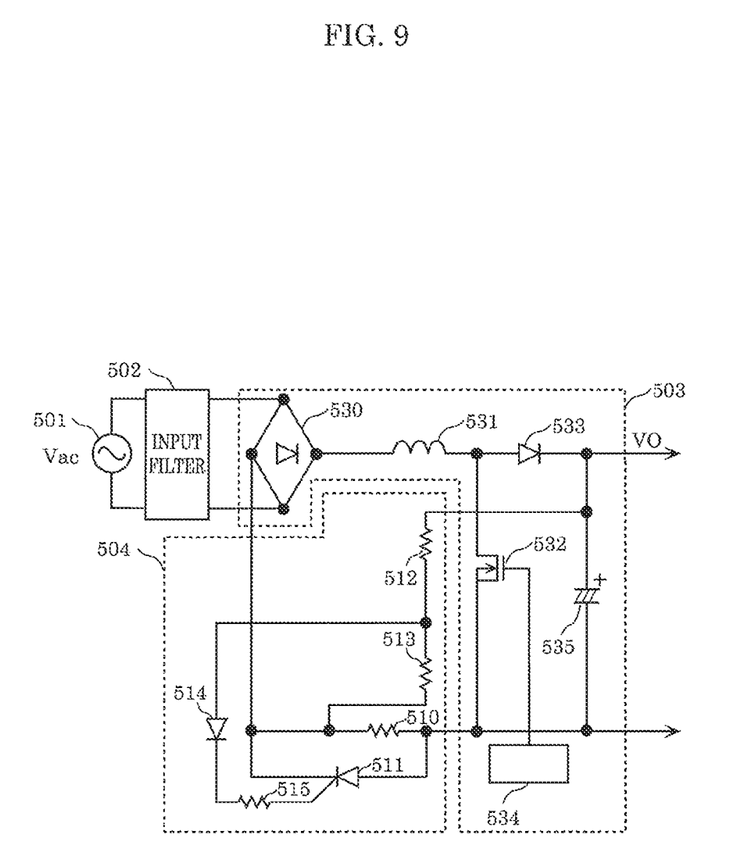
FIG. 9 is a circuit diagram of an AC-DC converter disclosed in PLT1.

FIG. 9 is a circuit diagram of an AC-DC converter disclosed in PLT1. In FIG. 9, input AC voltage Vac output from input AC power supply 501 is input to step-up converter 503 via input filter 502. Step-up converter 503 includes bridge diode 530, inductor 531, switching transistor 532, diode 533, control drive circuit 534, and output capacitor 535. Input AC voltage Vac input to step-up converter 503 is full-wave rectified by bridge diode 530 and is intermittently applied to inductor 531 by the switching operation of switching transistor 532. A flyback voltage generated in inductor 531 during the off period of switching transistor 532 is added to a rectified voltage output from bridge diode 530, is rectified and smoothed by diode 533 and output capacitor 535, and is output as output DC voltage VO. Control drive circuit 534 has a power-factor improving function that switching-drives switching transistor 532 while controlling an on/off time ratio such that an input AC passing through an input AC line follows an input AC-voltage waveform while output DC voltage VO is substantially stabilized.

In FIG. 9, inrush current suppressing circuit 504 is configured such that inrush current suppressing resistor 510 is provided between bridge diode 530 and switching transistor 532, thyristor 511 is attached in parallel with inrush current suppressing resistor 510, a voltage across output capacitor 535 (that is, output DC voltage VO) is divided by resistor 512 and resistor 513, and thyristor 511 is triggered via diode 514 and resistor 515. With this configuration, an input current is suppressed by inrush current suppressing resistor 510 when output DC voltage VO is not higher than a set value. When the charging of output capacitor 535 proceeds and output DC voltage VO reaches the set value, thyristor 511 is triggered to short-circuit inrush current suppressing resistor 510. In other words, when output capacitor 535 is not sufficiently charged in an initial stage where the application of input AC voltage Vac is started, a current is applied via inrush current suppressing resistor 510. Thus, an inrush current can be prevented and thyristor 511 is brought into conduction when charge is stored in output capacitor 535 and raises output DC voltage VO to at least a constant value. This prevents inrush current suppressing resistor 510 from causing a conduction loss.

SUMMARY

In the AC-DC converter including the inrush current suppressing circuit configured according to the related art, however, the timing for short-circuiting inrush current suppressing resistor 510 only depends on the set value reached by output DC voltage VO. Thus, an inrush current flows when the absolute value of the input AC voltage is not lower than the set value. In order to securely prevent the inrush current, it is necessary to have the set value higher than the peak value of a rated maximum input AC voltage, that is, close to an output DC voltage sufficiently raised by stably operating step-up converter 503, thereby considerably limiting the degree of freedom in the selection of the set value.

In view of the circumstances, an object of the present disclosure is to provide a step-up AC-DC converter that receives an input AC voltage like a power-factor improving converter and includes an inrush current suppressing circuit that can properly prevent an inrush current according to a simple method regardless of an input AC voltage or the circuit configuration of a step-up converter.

In order to address the above-described object, in accordance with an aspect of the present disclosure, there is an AC-DC converter including: an input AC power supply that outputs an input AC voltage; a step-up converter that converts the input AC voltage into an output DC voltage and outputs the output DC voltage from an output capacitor; and an inrush current suppressing circuit, the inrush current suppressing circuit including: an inrush current suppressing resistor provided on a path through which a current from the input AC power supply flows to charge the output capacitor of the step-up converter and returns to the input AC power supply; a resistance short-circuiting switch that short-circuits the inrush current suppressing resistor; and a control circuit that generates a signal for turning off the resistance short-circuiting switch when an absolute value of the input AC voltage is higher than the output DC voltage.

The inrush current suppressing circuit of the AC-DC converter according to one aspect of the present disclosure can securely release the inrush current suppressing resistor if an inrush current may flow, thereby suppressing the inrush current.

It is also possible that the step-up converter includes: a full-wave rectifying circuit that full-wave rectifies the input AC voltage; a series circuit of an inductor and a step-up switch, the series circuit being connected in parallel with an output of the full-wave rectifying circuit; a rectifying/smoothing circuit including a rectifier and the output capacitor, the rectifier rectifying and smoothing a voltage across the step-up switch; and a control drive circuit that controls driving of the step-up switch, and the control circuit generates the signal for turning off the resistance short-circuiting switch when an input rectified voltage output from the full-wave rectifying circuit is higher than the output DC voltage. With this configuration, a comparison between a full-wave rectified output and the output DC voltage with a simple circuit configuration can securely suppress an inrush current.

Here, it is possible that the control circuit includes: an output detection circuit that divides or level-shifts the output DC voltage and then outputs an output detection voltage; an input detection circuit that divides or level-shifts the input rectified voltage and then outputs an input detection voltage;

and a comparator that compares the output detection voltage and the input detection voltage, and the control circuit turns off the resistance short-circuiting switch when a voltage difference between the output DC voltage and the input rectified voltage is equal to or smaller than a first reference value. Thus, an inrush current suppressing condition can be set on the safety side in consideration of variations in the accuracy of detection of an input/output voltage.

It is further possible that the step-up converter includes: a first input terminal that receives the input AC voltage from one end of the input AC power supply through an inductor; a second input terminal that receives the input AC voltage from another end of the input AC power supply; a first series circuit in which a high-side switch and a low-side switch are connected in series, the high-side switch and the low-side switch each being connected to the first input terminal; a second series circuit in which a high-side rectifier and a low-side rectifier are connected in series, the high-side rectifier and the low-side rectifier each being connected to the second input terminal; a control drive circuit that controls driving of the high-side switch and the low-side switch; and the output capacitor connected in parallel with the first series circuit and the second series circuit, and that the control circuit generates a signal for turning on the resistance short-circuiting switch when the one end of the input AC power supply has a potential between a ground potential of the step-up converter and the output DC voltage. With this configuration, a comparison between one end of an input AC line and the output DC voltage with a simple circuit configuration can securely suppress an inrush current in a circuit system referred to as a totem-pole bridgeless PFC.

Here, it is possible that the control circuit includes: an output detection circuit that divides or level-shifts the output DC voltage and then outputs an output detection voltage; an input detection circuit that divides or level-shifts a potential of one end of the input AC power supply and then outputs an input detection voltage; a first comparator that compares the input detection voltage and the ground potential of the step-up converter; and a second comparator that compares the input detection voltage and the output detection voltage, and that the control circuit turns off the resistance short-circuiting switch when a voltage difference between the output DC voltage and the potential of the one end of the input AC power supply is equal to or smaller than a first reference value and a voltage difference between the output detection voltage and the ground potential of the step-up converter is equal to or smaller than the first reference value. This adjusts the division ratio and the level shift amount of each of the detection circuits or the offset voltage of each of the comparators. Thus, the inrush current suppressing condition can be set on the safety side in consideration of variations in the accuracy of detection of an input/output voltage.

It is further possible that the step-up converter includes: a first input terminal that receives the input AC voltage from one end of the input AC power supply through a first inductor; a second input terminal that receives the input AC voltage from another end of the input AC power supply through a second inductor; a first series circuit in which a first high-side rectifier and a first switch are connected in series, the first high-side rectifier and the first switch being connected to the first input terminal; a second series circuit in which a second high-side rectifier and a second switch are connected in series, the second high-side rectifier and the second switch being connected to the second input terminal; a control drive circuit that controls driving of the first switch and the second switch; the output capacitor connected in parallel with the first series circuit and the second series circuit; a first low-side rectifier connected between a node between the first switch and the second switch and the one end of the input AC power supply; and a second low-side rectifier connected between the node between the first switch and the second switch and the other end of the input AC power supply, and that the control circuit generates a signal for turning on the resistance short-circuiting switch when potentials of the one end and the other end of the input AC power supply are both lower than the output DC voltage. With this configuration, a comparison between one end of the input AC line and the output DC voltage with a simple circuit configuration can securely suppress an inrush current in a circuit system referred to as a double step-up bridgeless PFC.

Here, it is possible that the control circuit includes: an output detection circuit that divides or level-shifts the output DC voltage and then outputs an output detection voltage; a first input detection circuit that divides or level-shifts a potential of one end of the input AC power supply and then outputs a first input detection voltage; a second input detection circuit that divides or level-shifts a potential of another end of the input AC power supply and then outputs a second input detection voltage; a first comparator that compares the output detection voltage and the first input detection voltage; and a second comparator that compares the output detection voltage and the second input detection voltage, and that the control circuit turns off the resistance short-circuiting switch when a voltage difference between the output DC voltage and the potential of the one end of the input AC power supply is equal to or smaller than a first reference value and a voltage difference between the output detection voltage and the potential of the other end of the input AC power supply is equal to or smaller than the first reference value. This adjusts the division ratio and the level shift amount of each of the detection circuits or the offset voltage of each of the comparators. Thus, the inrush current suppressing condition can be set on the safety side in consideration of variations in the accuracy of detection of an input/output voltage.

In the AC-DC converter according to one aspect of the present disclosure, the inrush current suppressing circuit operates when the input AC voltage is not lower than the output DC voltage. In other words, the AC-DC converter can securely suppress an inrush current that may flow upon startup as well as recovery from a momentary interruption of input, e.g., an instantaneous power failure.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENTS

Embodiment 1

Figure 1:
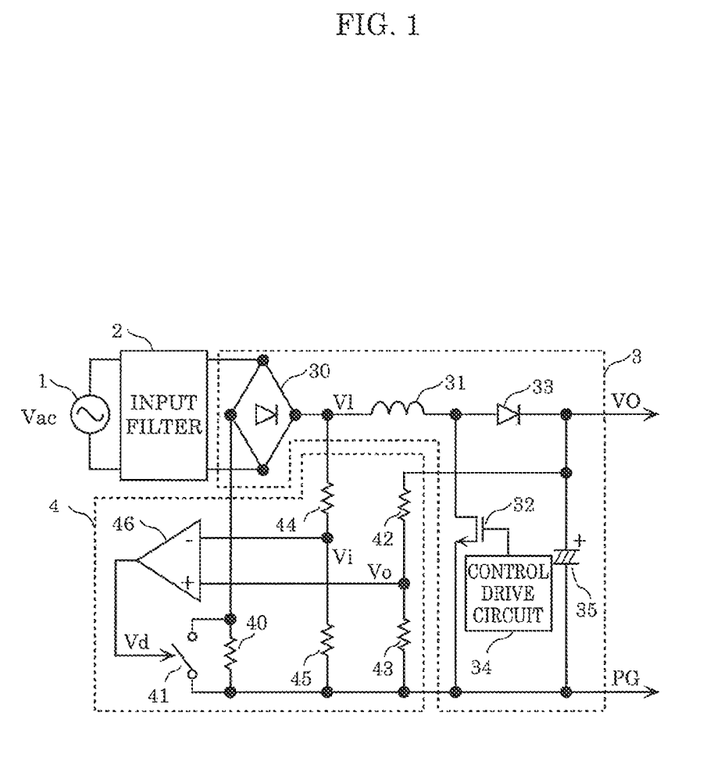
FIG. 1 is a circuit diagram of an AC-DC converter according to Embodiment 1.

The following describes the AC-DC converter according to Embodiment 1 of the present disclosure with reference to the drawings. FIG. 1 is a circuit diagram of the AC-DC converter according to Embodiment 1.

As shown in FIG. 1, the AC-DC converter according to Embodiment 1 includes input AC power supply 1 that supplies input AC voltage Vac, input filter 2 for removing noise from an input AC line, step-up converter 3, and inrush current suppressing circuit 4.

Step-up converter 3 includes bridge diode 30 that is a full-wave rectifying circuit, inductor 31, switching transistor 32 that is a step-up switch, diode 33 that is a rectifier, control drive circuit 34, and output capacitor 35. Input AC voltage Vac output from input AC power supply 1 is input to step-up converter 3 via input filter 2. Input AC voltage Vac input to step-up converter 3 is full-wave rectified by bridge diode 30 and is output as input rectified voltage VI. Input rectified voltage VI is intermittently applied to inductor 31 by the switching operation of switching transistor 32. A flyback voltage generated in inductor 31 during the off period of switching transistor 32 is added to input rectified voltage VI, is rectified and smoothed by diode 33 and output capacitor 35, and is output as output DC voltage VO from output capacitor 35. Control drive circuit 34 has a power-factor improving function that switching-drives switching transistor 32 while controlling an on/off time ratio such that an input AC passing through an input AC line follows an input AC-voltage waveform while output DC voltage VO is substantially stabilized.

Inrush current suppressing circuit 4 includes a control circuit that has inrush current suppressing resistor 40, resistance short-circuiting switch 41, resistors 42 to 45, and comparator 46. Inrush current suppressing resistor 40 is connected between bridge diode 30 and switching transistor 32 and resistance short-circuiting switch 41 is connected in parallel with inrush current suppressing resistor 40. Resistors 42 and 43 divide a voltage across output capacitor 35, that is, output DC voltage VO and then output output detection voltage Vo. Resistors 44 and 45 divide an output voltage of bridge diode 30, that is, input rectified voltage VI and then output input detection voltage Vi. Detection voltages Vo and Vi are input to comparator 46 and are compared with each other therein. In this case, the resistance ratio between resistors 42 and 43 and the resistance ratio between resistors 44 and 45 are equal to each other. The detection voltages are set such that the comparison between the detection voltages corresponds to a comparison between input rectified voltage VI and output DC voltage VO. The output of comparator 46 serves as driving signal Vd of resistance short-circuiting switch 41.

Figure 2A:
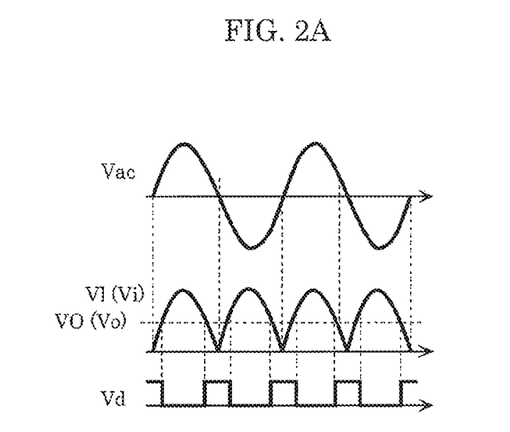
FIG. 2A is a waveform chart showing a principal part of the AC-DC converter according to Embodiment 1 if an input rectified voltage is higher than an output DC voltage.
Figure 2B:
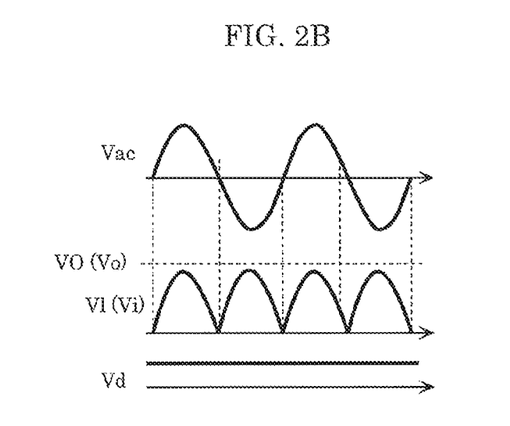
FIG. 2B is a waveform chart showing a principal part of the AC-DC converter according to Embodiment 1 if an output DC voltage is higher than an input rectified voltage.

FIG. 2A is a waveform chart showing the principal part of the AC-DC converter according to Embodiment 1 if input rectified voltage VI is higher than output DC voltage VO. FIG. 2B is a waveform chart showing the principal part of the AC-DC converter according to Embodiment 1 if output DC voltage VO is higher than input rectified voltage VI. More specifically, FIGS. 2A and 2B show the waveforms of input AC voltage Vac, input rectified voltage VI (input detection voltage Vi), output DC voltage VO (output detection voltage Vo), and driving signal Vd. Referring to FIGS. 2A and 2B, the inrush current suppressing operation of the AC-DC converter according to Embodiment 1 will be described below.

In inrush current suppressing circuit 4, driving signal Vd that is the comparison result of input detection voltage Vi and output detection voltage Vo is set at "H" and turns on resistance short-circuiting switch 41 when input detection voltage Vi is lower than output detection voltage Vo. Conversely, driving signal Vd is set at "L" and turns off resistance short-circuiting switch 41 when input detection voltage Vi is higher than output detection voltage Vo.

In other words, if input rectified voltage VI forming a full-wave rectification waveform is higher than output DC voltage VO as shown in FIG. 2A, resistance short-circuiting switch 41 is turned off and inrush current suppressing resistor 40 on a current path suppresses an inrush current. On the other hand, when input rectified voltage VI is lower than output DC voltage VO, resistance short-circuiting switch 41 is turned on and inrush current suppressing resistor 40 is short-circuited. In other words, regardless of whether step-up converter 3 is operated or stopped, resistance short-circuiting switch 41 is turned off and inrush current suppressing resistor 40 suppresses an inrush current in a state where an inrush current may flow when input rectified voltage VI is higher than output DC voltage VO.

As shown in FIG. 2B, resistance short-circuiting switch 41 is turned on in a state where output DC voltage VO is sufficiently increased by the operation of step-up converter 3 and is always higher than VI and an inrush current is unlikely to flow. In this state, inrush current suppressing resistor 40 is short-circuited and does not cause a conduction loss.

As described above, in the AC-DC converter according to the present embodiment, the inrush current suppressing circuit operates when the absolute value of the input AC voltage is not lower than the output DC voltage. In other words, the AC-DC converter can securely suppress an inrush current that may flow upon startup as well as recovery from a momentary interruption of input, e.g., an instantaneous power failure.

In most cases, input rectified voltage VI and output DC voltage VO are basically monitored to control an AC-DC converter. According to the detection result, driving signal Vd of resistance short-circuiting switch 41 for short-circuiting inrush current suppressing resistor 40 can be generated by using a small number of comparators 46 and logic circuits. Thus, the AC-DC converter according to the present embodiment hardly increases the number of components unlike the AC-DC converter of the related art.

Note that in the present embodiment, an input rectified voltage as the absolute value of an input AC voltage and the output DC voltage of the step-up converter are detected by resistance voltage division. The voltages may be detected by, for example, the voltage division of a capacitor and a partial voltage level shift is allowed. The accuracy of detection is important in the present embodiment and the present embodiment is not limited by the method of detection.

In order to securely suppress an inrush current, a margin may be set in consideration of the accuracy of detection. Specifically, when input rectified voltage VI and output DC voltage VO of the step-up converter are equal to each other, it is desirable that resistance short-circuiting switch 41 is turned off and a turn-off region for resistance short-circuiting switch 41 is widely set as a safety side. For example, when a voltage difference between output DC voltage VO and input rectified voltage VI is not larger than a first reference value (e.g., 10 V) as a margin, resistance short-circuiting switch 41 is turned off. In the case of resistance voltage division in Embodiment 1, the division ratio of resistors 44 and 45 may be set larger than that of resistors 42 and 43 in consideration of variations in resistance value such that detected input rectified voltage VI is larger than an actual voltage.

Embodiment 2

Figure 3:
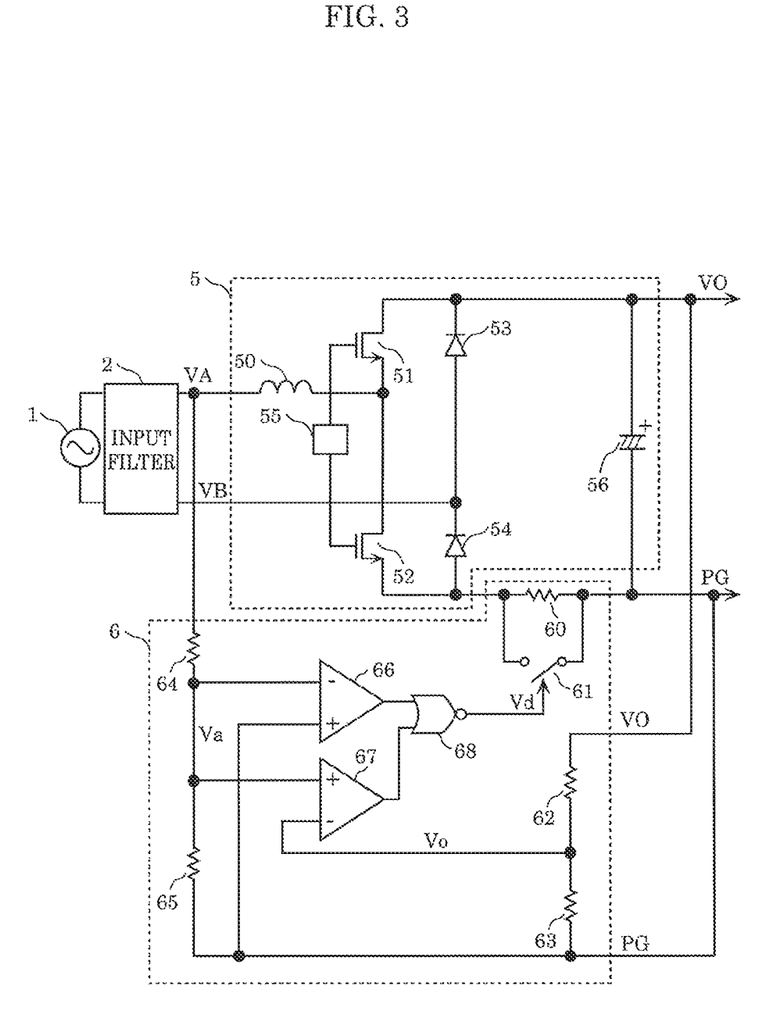
FIG. 3 is a circuit diagram of an AC-DC converter according to Embodiment 2.

FIG. 3 is a circuit diagram of an AC-DC converter according to Embodiment 2. As shown in FIG. 3, the AC-DC converter according to Embodiment 2 includes input AC power supply 1, input filter 2 for removing noise from an input AC line, step-up converter 5, and inrush current suppressing circuit 6.

Step-up converter 5 has a circuit configuration referred to as a totem-pole bridgeless PFC and includes inductor 50, high-side switching transistor 51 acting as a high-side switch, low-side switching transistor 52 acting as a low-side switch, high-side diode 53 acting as a high-side rectifier, low-side diode 54 acting as a low-side rectifier, control drive circuit 55, and output capacitor 56. The line of input AC power supply 1 includes line VA that is input to the node between high-side switching transistor 51 and low-side switching transistor 52 via inductor 50. The other line VB of input AC power supply 1 is input to the node between high-side diode 53 and low-side diode 54. The series circuit of high-side switching transistor 51 and low-side switching transistor 52 and the series circuit of high-side diode 53 and low-side diode 54 are connected in parallel to output capacitor 56. Output DC voltage VO is output from output capacitor 56. The ground of step-up converter 5 is denoted as PG. Hereinafter, potentials will be set with respect to PG.

Inrush current suppressing circuit 6 includes a control circuit that has inrush current suppressing resistor 60, resistance short-circuiting switch 61, resistors 62 to 65, first comparator 66, second comparator 67, and NOR circuit 68. Inrush current suppressing resistor 60 is connected between output capacitor 56 and the node between low-side switching transistor 52 and low-side diode 54. Resistance short-circuiting switch 61 is connected in parallel with inrush current suppressing resistor 60. Resistors 62 and 63 divide a voltage across output capacitor 56, that is, output DC voltage VO and then output output detection voltage Vo. Resistors 64 and 65 divide the potential of AC line VA and output input detection voltage Va. First comparator 66 compares input detection voltage Va and ground PG and outputs an "H"-level signal when Va<PG is established. Second comparator 67 compares input detection voltage Va and output detection voltage Vo and outputs an "H"-level signal when Va>Vo is established. In this case, the resistance ratio between resistors 62 and 63 and the resistance ratio between resistors 64 and 65 are equal to each other. The detection voltages are set such that the comparison between the detection voltages corresponds to a comparison between input voltage VA and output DC voltage VO. NOR circuit 68 outputs driving signal Vd that is the logical NOR of the output of first comparator 66 and the output of second comparator 67. Resistance short-circuiting switch 61 is turned on or off in response to driving signal Vd.

The operations of the AC-DC converter configured thus according to the present embodiment will be described below.

First, if AC line VA has a positive phase at a higher potential than VB, a current sequentially passes through input AC power supply 1 (VA), inductor 50, low-side switching transistor 52, low-side diode 54, and input AC power supply 1 (VB) and excites inductor 50 when low-side switching transistor 52 is turned on and high-side switching transistor 51 is turned off. Conversely, when low-side switching transistor 52 is turned off and high-side switching transistor 51 is turned on, a current sequentially passes through input AC power supply 1 (VA), inductor 50, high-side switching transistor 51, output capacitor 56, low-side diode 54, and input AC power supply 1 (VB) and emits the accumulated energy of inductor 50 as the charging current of output capacitor 56.

After that, if AC line VA has a negative potential lower than VB, a current sequentially passes through input AC power supply 1 (VB), high-side diode 53, high-side switching transistor 51, inductor 50, and input AC power supply 1 (VA) and excites inductor 50 when high-side switching transistor 51 is turned on and low-side switching transistor 52 is turned off. Conversely, when high-side switching transistor 51 is turned off and low-side switching transistor 52 is turned on, a current sequentially passes through input AC power supply 1 (VB), high-side diode 53, output capacitor 56, low-side switching transistor 52, inductor 50, and input AC power supply 1 (VA) and emits the accumulated energy of inductor 50 as the charging current of output capacitor 56.

As described above, input AC voltage Vac input to step-up converter 5 is intermittently applied to inductor 50 by the switching operations of high-side switching transistor 51 and low-side switching transistor 52 and is output as output DC voltage VO, which is raised by adding the flyback voltage of inductor 50, from output capacitor 56. Control drive circuit 55 has a power-factor improving function that controls the switching-drive of high-side switching transistor 51 and low-side switching transistor 52 while controlling an on/off time ratio such that an input AC passing through an input AC line follows an input AC-voltage waveform while output DC voltage VO is substantially stabilized.

Figure 4A:
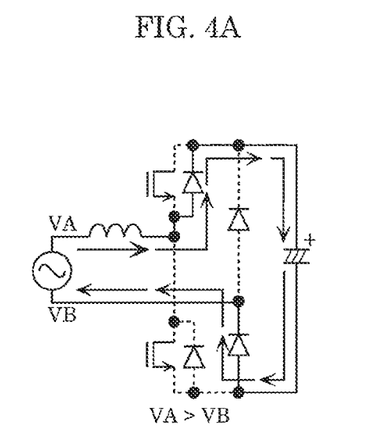
FIG. 4A is a current path diagram at a positive phase of the AC-DC converter according to Embodiment 2.
Figure 4B:
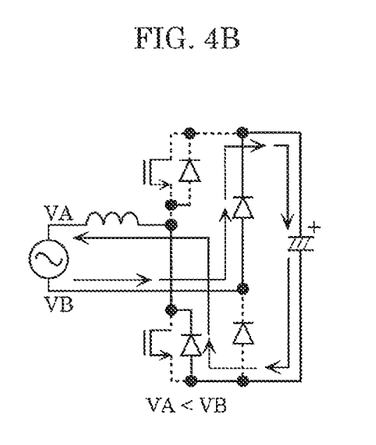
FIG. 4B is a current path diagram at a negative phase of the AC-DC converter according to Embodiment 2.

FIG. 4A is a current path diagram at the positive phase of the AC-DC converter according to Embodiment 2. FIG. 4B is a current path diagram at the negative phase of the AC-DC converter according to Embodiment 2. More specifically, FIGS. 4A and 4B show the paths of inrush current in an initial stage where output capacitor 56 has a low voltage when input AC power supply 1 starts outputting input AC voltage Vac. FIG. 4A shows the positive phase of VA>VB and FIG. 4B shows the negative phase of VA<VB. In FIGS. 4A and 4B, a diode is connected in an inverse-parallel manner to each switching transistor. This is because, when the switching transistor is turned off, unilateral conductivity of a diode is desired in step-up converter 5 instead of a complete turned-off state to operate as a bridgeless PFC. When the transistor is completely turned off, an inrush current is not applied but output capacitor 56 cannot be charged before the operation of step-up converter 5. Thus, a step-up switching operation is performed with a low output voltage. This prevents inductor 50 from emitting exciting energy and enhances DC superposition so as to cause an excessive inrush current. In the case of a MOSFET switching transistor, a parasitic diode such as a body diode is used. In the case of an IGBT, another diode is connected. In the case of a recently developed nitride semiconductor transistor, a body diode is not structurally provided but a conduction mode between channels is available when a voltage is applied between the drain and source in the reverse direction even if the gate is turned off. This apparently enables an operation as if a body diode is present. An inrush current passes through the switching transistor having unilateral conductivity and thus if a switching transistor having a low peak current withstand is used, it is necessary to securely suppress an inrush current in a state where the inrush current may flow, that is, the absolute value of input AC voltage is larger than the output DC voltage.

Figure 5A:
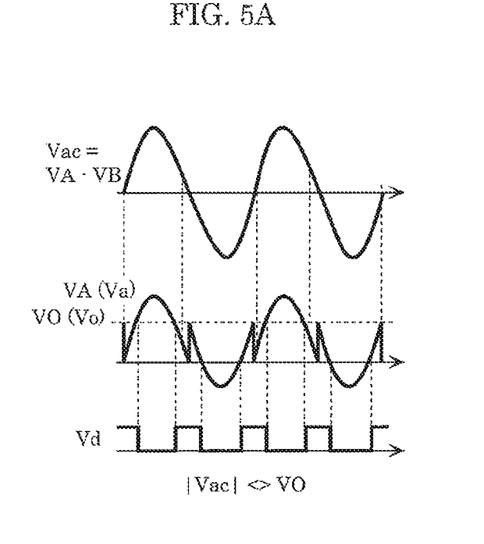
FIG. 5A is a principal-part waveform chart showing a case where an absolute value of an input AC voltage can be higher than an output DC voltage in the AC-DC converter according to Embodiment 2.
Figure 5B:
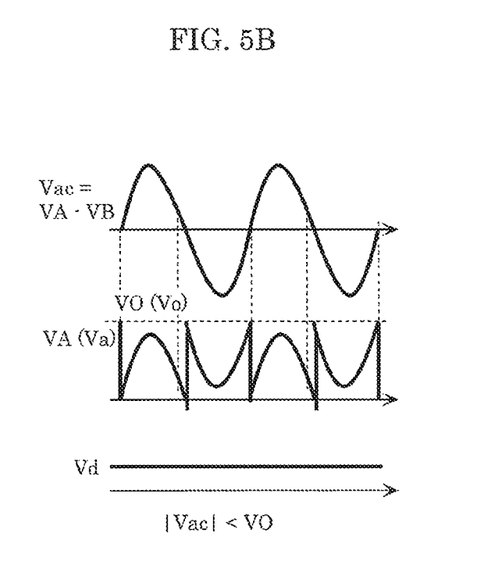
FIG. 5B is a principal-part waveform chart showing a case where an output DC voltage is always higher than an absolute value of an input AC voltage in the AC-DC converter according to Embodiment 2.

Referring to FIGS. 5A and 5B, the inrush current suppressing operation of the AC-DC converter according to Embodiment 2 will be described below.

FIG. 5A is a principal-part waveform chart showing a case where the absolute value of input AC voltage Vac can be higher than output DC voltage VO in the AC-DC converter according to Embodiment 2. FIG. 5B is a principal-part waveform chart showing a case where output DC voltage VO is always higher than the absolute value of input AC voltage Vac in the AC-DC converter according to Embodiment 2. FIGS. 5A and 5B show input AC voltage Vac (=VA−VB), input voltage VA (input detection voltage Va), output DC voltage VO (output detection voltage Vo), and driving signal Vd. Note that the potential of the other input line VB, which is not shown, serves as ground PG of step-up converter 5 because low-side diode 54 conducts with a positive phase, whereas the potential serves as output DC voltage VO because high-side diode 53 conducts with a negative phase. Thus, input voltage VA serves as input AC voltage Vac with a positive phase, whereas input voltage VA is a difference voltage (VO+Vac=VO−|Vac|) between output DC voltage VO and input AC voltage Vac with a negative phase.

In inrush current suppressing circuit 6, the output of first comparator 66 is set at "H" level when input detection voltage Va is lower than ground PG of step-up converter 5, that is, when the absolute value of input AC voltage Vac is higher than output DC voltage VO with a negative phase. On the other hand, the output of second comparator 67 is set at "H" level when input detection voltage Va is higher than output detection voltage Vo, that is, when the absolute value of input AC voltage Vac is higher than output DC voltage VO with a positive phase. The output of NOR circuit 68 as a negative OR, that is, driving signal Vd is set at "L" level and turns off resistance short-circuiting switch 61 when the absolute value of input AC voltage Vac is higher than output DC voltage VO.

In other words, as shown in FIG. 5A, when the absolute value of input AC voltage Vac is higher than output DC voltage VO, resistance short-circuiting switch 61 is turned off and inrush current suppressing resistor 60 on a current path suppresses an inrush current. When the absolute value of input AC voltage Vac is lower than output DC voltage VO, resistance short-circuiting switch 61 is turned on and inrush current suppressing resistor 60 is short-circuited. In other words, regardless of whether step-up converter 5 is operated or stopped, resistance short-circuiting switch 61 is turned off and inrush current suppressing resistor 60 suppresses an inrush current in a state where an inrush current may flow. As shown in FIG. 5B, resistance short-circuiting switch 61 is turned on in a state where output DC voltage VO is sufficiently increased by the operation of step-up converter 5 and is always higher than VA and an inrush current is unlikely to flow. Thus, inrush current suppressing resistor 60 is short-circuited and does not cause a conduction loss.

As described above, in the AC-DC converter according to the present embodiment, the inrush current suppressing circuit operates when the input AC voltage is not lower than the output DC voltage. In other words, the AC-DC converter can securely suppress an inrush current that may flow upon startup as well as recovery from a momentary interruption of input, e.g., an instantaneous power failure.

In most cases, input rectified voltage VI and output DC voltage VO are basically monitored to control an AC-DC converter. According to the detection result, driving signal Vd of resistance short-circuiting switch 61 for short-circuiting inrush current suppressing resistor 60 can be generated by using a small number of comparators and logic circuits. Thus, the AC-DC converter according to the present embodiment hardly increases the number of components unlike the AC-DC converter of the related art.

Note that in the present embodiment, one line potential of an input AC voltage and the output DC voltage of the step-up converter are detected by resistance voltage division. The potential and the voltage may be detected by, for example, the voltage division of a capacitor and a partial voltage level shift is allowed. In the present embodiment, the accuracy of detection is important but the method of detection is not limited.

In order to securely suppress an inrush current, a margin may be set in consideration of the accuracy of detection. Specifically, when one line potential of the input AC voltage and the output DC voltage of the step-up converter are equal to each other, it is desirable that resistance short-circuiting switch 61 is turned off and a turn-off region for resistance short-circuiting switch 61 is widely set as a safety side. For example, when a voltage difference between the output DC voltage (VO) and the potential (VA) of one end of the input AC power supply is not larger than a first reference value (e.g., 10 V) as a margin and when a voltage difference between output detection voltage Vo and the ground potential (PG) of the step-up converter is not larger than the first reference value, resistance short-circuiting switch 61 is turned off. In the case of resistance voltage division in the present embodiment, the division ratio of resistors 64 and 65 may be set larger than that of resistors 62 and 63 in consideration of variations in resistance value such that detected input AC voltage VA is larger than an actual voltage.

Embodiment 3

Figure 6:
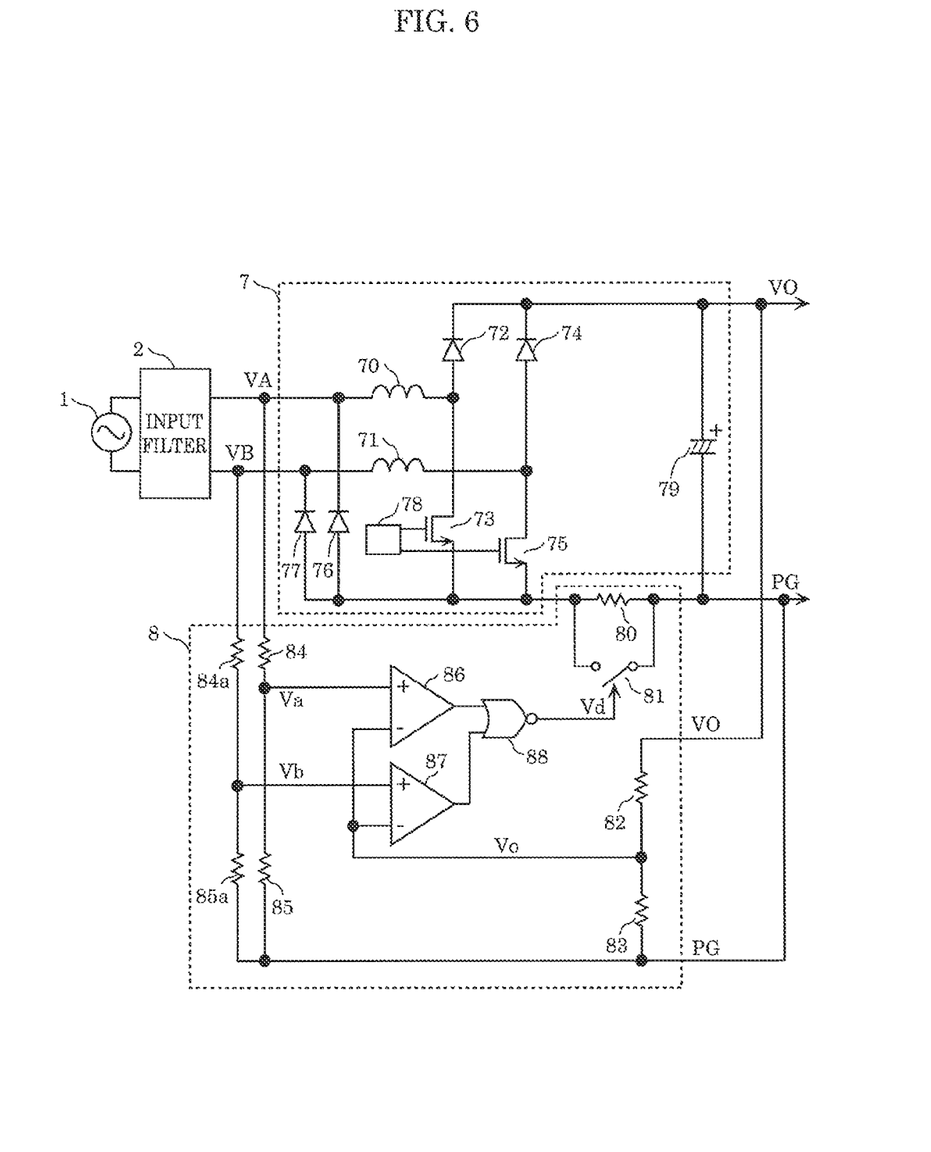
FIG. 6 is a circuit diagram of an AC-DC converter according to Embodiment 3.

FIG. 6 is a circuit diagram of an AC-DC converter according to Embodiment 3. As shown in FIG. 6, the AC-DC converter according to Embodiment 3 includes input AC power supply 1 that supplies input AC voltage Vac between input AC line VA and input AC line VB, input filter 2 for removing noise from the input AC line, step-up converter 7, and inrush current suppressing circuit 8.

Step-up converter 7 includes first inductor 70, second inductor 71, first high-side diode 72 acting as a first high-side rectifier, first switching transistor 73 acting as a first switch, second high-side diode 74 acting as a second high-side rectifier, second switching transistor 75 acting as a second switch, first low-side diode 76 acting as a first low-side rectifier, second low-side diode 77 acting as a second low-side rectifier, control drive circuit 78, and output capacitor 79. The other end of first inductor 70 connected to input AC line VA is connected to the node between first high-side diode 72 and first switching transistor 73. The other end of second inductor 71 connected to input AC line VB is connected to the node between second high-side diode 74 and second switching transistor 75. The series circuit of first high-side diode 72 and first switching transistor 73 and the series circuit of second high-side diode 74 and second switching transistor 75 are connected in parallel to output capacitor 79. Output DC voltage VO is output from output capacitor 79. First low-side diode 76 is connected between the node between the switching transistors and input AC line VA and second low-side diode 77 is connected between the node between the switching transistors and input AC line VB. The ground of step-up converter 7 is denoted as PG. Hereinafter, potentials will be set with respect to PG.

Inrush current suppressing circuit 8 includes a control circuit that has inrush current suppressing resistor 80, resistance short-circuiting switch 81, resistors 82 to 85, 84a, and 85a, first comparator 86, second comparator 87, and NOR circuit 88. Inrush current suppressing resistor 80 is connected between output capacitor 79 and the node between first switching transistor 73 and second switching transistor 75. Resistance short-circuiting switch 81 is connected in parallel with inrush current suppressing resistor 80. Resistors 82 and 83 divide a voltage across output capacitor 79, that is, output DC voltage VO and then output output detection voltage Vo. Resistors 84 and 85 divide the potential of AC line VA and output input detection voltage Va. Resistors 84a and 85a divide the potential of AC line VB and output input detection voltage Vb. First comparator 86 compares input detection voltage Va and output detection voltage Vo and outputs an "H"-level signal when Va>Vo is established. Second comparator 87 compares input detection voltage Vb and output detection voltage Vo and outputs an "H"-level signal when Vb>Vo is established. In this case, the resistance ratio between resistors 82 and 83, the resistance ratio between resistors 84 and 85, and the resistance ratio between resistors 84a and 85a are equal to one another. The detection voltages are set such that the comparison between the detection voltages corresponds to a comparison between input voltage VA and output DC voltage VO and a comparison between input voltage VB and output DC voltage VO. NOR circuit 88 outputs driving signal Vd that is the logical NOR of the output of first comparator 86 and the output of second comparator 87. Resistance short-circuiting switch 81 is turned on or off in response to driving signal Vd.

The operations of the AC-DC converter configured thus according to the present embodiment will be described below.

First, if AC line VA has a positive phase at a higher potential than VB, first switching transistor 73 performs a switching operation and second switching transistor 75 is fixed to an on-state. Thus, in the case of a positive phase, both ends of second inductor 71 are short-circuited by second switching transistor 75 and second low-side diode 77, which is substantially irrelevant to the operation. When first switching transistor 73 is turned on with a positive phase, a current sequentially passes through input AC power supply 1 (VA), first inductor 70, first switching transistor 73, second low-side diode 77, and input AC power supply 1 (VB) and excites first inductor 70. When first switching transistor 73 is turned off, a current sequentially passes through input AC power supply 1 (VA), first inductor 70, first high-side diode 72, output capacitor 79, second low-side diode 77, and input AC power supply 1 (VB) and emits the accumulated energy of first inductor 70 as a charging current to output capacitor 79.

Subsequently, if AC line VA has a negative phase at a lower potential than VB, second switching transistor 75 performs a switching operation and first switching transistor 73 is fixed to an on-state. Thus, in the case of a negative phase, both ends of first inductor 70 are short-circuited by first switching transistor 73 and first low-side diode 76, which is substantially irrelevant to the operation. When second switching transistor 75 is turned on with a negative phase, a current sequentially passes through input AC power supply 1 (VB), second inductor 71, second switching transistor 75, first low-side diode 76, and input AC power supply 1 (VA) and excites second inductor 71. When second switching transistor 75 is turned off, a current sequentially passes through input AC power supply 1 (VB), second inductor 71, second high-side diode 74, output capacitor 79, first low-side diode 76, and input AC power supply 1 (VA) and emits the accumulated energy of second inductor 71 as a charging current to output capacitor 79.

As described above, input AC voltage Vac input to step-up converter 7 is intermittently applied to first inductor 70 or second inductor 71 respectively by the switching operation of first switching transistor 73 or second switching transistor 75 and is output as output DC voltage VO, which is raised by adding a generated flyback voltage, from output capacitor 79. Control drive circuit 78 has a power-factor improving function that controls the switching-drive of first switching transistor 73 and second switching transistor 75 while controlling an on/off time ratio such that an input AC passing through an input AC line follows an input AC-voltage waveform while output DC voltage VO is substantially stabilized.

Figure 7A:
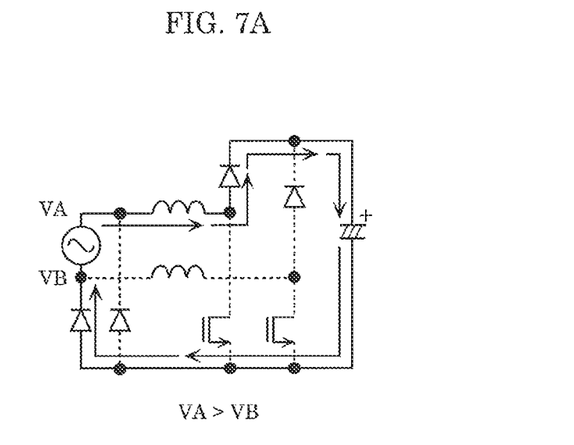
FIG. 7A is a current path diagram at a positive phase of the AC-DC converter according to Embodiment 3.
Figure 7B:
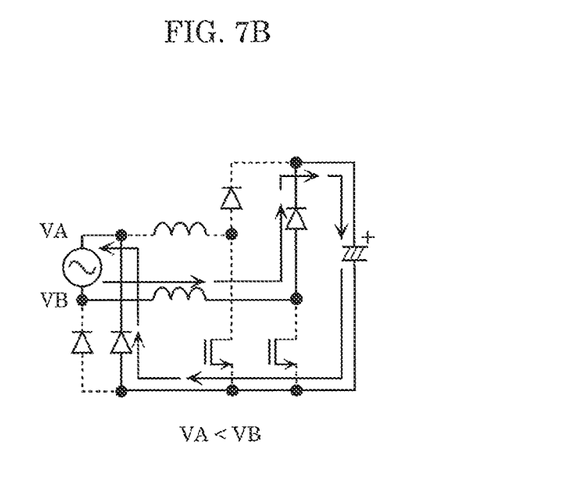
FIG. 7B is a current path diagram at the negative phase of the AC-DC converter according to Embodiment 3.

FIG. 7A is a current path diagram at the positive phase of the AC-DC converter according to Embodiment 3. FIG. 7B is a current path diagram at the negative phase of the AC-DC converter according to Embodiment 3. More specifically, FIGS. 7A and 7B show the paths of inrush current in an initial stage where output capacitor 79 has a low voltage when input AC power supply 1 starts outputting input AC voltage Vac. FIG. 7A shows the positive phase of VA>VB and FIG. 7B shows the negative phase of VA<VB.

Figure 8A:
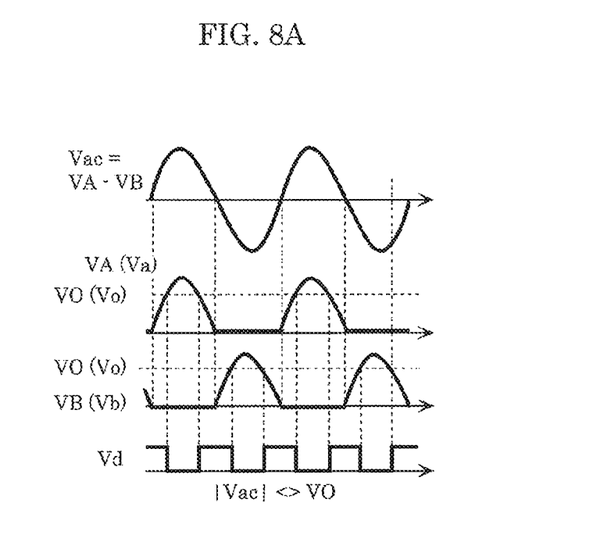
FIG. 8A is a principal-part waveform chart showing a case where an absolute value of an input AC voltage can be higher than an output DC voltage in the AC-DC converter according to Embodiment 3.
Figure 8B:
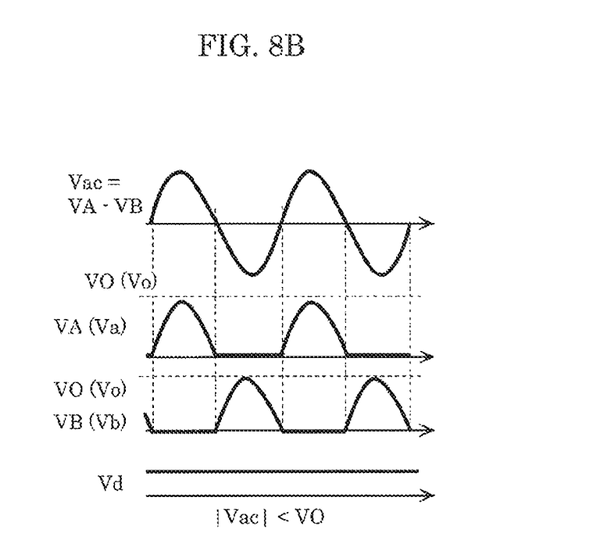
FIG. 8B is a principal-part waveform chart showing a case where an output DC voltage is always higher than an absolute value of an input AC voltage in the AC-DC converter according to Embodiment 3.

Referring to FIGS. 8A and 8B, the inrush current suppressing operation of the AC-DC converter according to Embodiment 3 will be described below.

FIG. 8A is a principal-part waveform chart showing a case where the absolute value of input AC voltage Vac can be higher than output DC voltage VO in the AC-DC converter according to Embodiment 3. FIG. 8B is a principal-part waveform chart showing a case where output DC voltage VO is always higher than the absolute value of input AC voltage Vac in the AC-DC converter according to Embodiment 3. FIGS. 8A and 8B show input AC voltage Vac (=VA−VB), input voltage VA (input detection voltage Va), input voltage VB (input detection voltage Vb), output DC voltage VO (output detection voltage Vo), and driving signal Vd.

In inrush current suppressing circuit 8, the output of first comparator 86 is set at "H" level when input detection voltage Va is higher than output detection voltage Vo, that is, when the absolute value of input AC voltage Vac is higher than output DC voltage VO with a positive phase. The output of second comparator 87 is set at "H" level when input detection voltage Vb is higher than output detection voltage Vo, that is, when the absolute value of input AC voltage Vac is higher than output DC voltage VO with a negative phase. The output of NOR circuit 88 as a negative OR, that is, driving signal Vd is set at "L" level and turns off resistance short-circuiting switch 81 when the absolute value of input AC voltage Vac is higher than output DC voltage VO.

In other words, as shown in FIG. 8A, when the absolute value of input AC voltage Vac is higher than output DC voltage VO, resistance short-circuiting switch 81 is turned off and inrush current suppressing resistor 80 on a current path suppresses an inrush current. When the absolute value of input AC voltage Vac is lower than output DC voltage VO, resistance short-circuiting switch 81 is turned on and inrush current suppressing resistor 80 is short-circuited. In other words, regardless of whether step-up converter 7 is operated or stopped, resistance short-circuiting switch 81 is turned off and inrush current suppressing resistor 80 suppresses an inrush current in a state where an inrush current may flow. As shown in FIG. 8B, resistance short-circuiting switch 81 is turned on in a state where output DC voltage VO is sufficiently increased by the operation of step-up converter 7 and is always higher than VA and VB and an inrush current is unlikely to flow. Thus, inrush current suppressing resistor 80 is short-circuited and does not cause a conduction loss.

As described above, in the AC-DC converter according to the present embodiment, the inrush current suppressing circuit operates when the input AC voltage is not lower than the output DC voltage. In other words, the AC-DC converter can securely suppress an inrush current that may flow upon startup as well as recovery from a momentary interruption of input, e.g., an instantaneous power failure.

In most cases, input rectified voltage VI and output DC voltage VO are basically monitored to control an AC-DC converter. According to the detection result, driving signal Vd of resistance short-circuiting switch 81 for short-circuiting inrush current suppressing resistor 80 can be generated by using a small number of comparators and logic circuits. Thus, the AC-DC converter according to the present embodiment hardly increases the number of components unlike the AC-DC converter of the related art.

Note that in the present embodiment, both line potentials of an input AC voltage and the output DC voltage of the step-up converter are detected by resistance voltage division. The potentials and the voltage may be detected by, for example, the voltage division of a capacitor and a partial voltage level shift is allowed. In the present embodiment, the accuracy of detection is important but the method of detection is not limited.

In order to securely suppress an inrush current, a margin may be set in consideration of the accuracy of detection. Specifically, when one line potential of the input AC voltage and the output DC voltage of the step-up converter are equal to each other, it is desirable that resistance short-circuiting switch 61 is turned off and a turn-off region for resistance short-circuiting switch 81 is widely set as a safety side. For example, when a voltage difference between output DC voltage VO and potential VA of one end of the input AC power supply is not larger than a first reference value (e.g., 10 V) as a margin and when a voltage difference between the output detection voltage and potential VB of the other end of the input AC power supply is not larger than the first reference value, resistance short-circuiting switch 81 is turned off. In the case of resistance voltage division in the present embodiment, the division ratio of resistors 84 and 85 and the division ratio of resistors 84a and 85a may be set larger than that of resistors 82 and 83 in consideration of variations in resistance value such that detected input AC voltages VA and VB are larger than actual voltages.

Other Embodiments

Although the AC-DC converter according to the present disclosure has been described with reference to Embodiments 1 to 3, the present disclosure is not limited to these embodiments. Those skilled in the art will be readily appreciated that various modifications of Embodiments 1 to 3 and combinations of the structural elements of the different embodiments are possible without materially departing from the novel teachings and advantages of the present disclosure. Accordingly, all such modifications and combinations are intended to be included within the scope of the present disclosure.

Note that in the case of a totem-pole bridgeless PFC like Embodiment 2, if a switching transistor is provided on an inrush current path, the tolerance of inrush current may be determined by the current withstand of the switching transistor. If components including the switching transistor on the inrush current path have a small current withstand capacity, the resistance value of the inrush current suppressing resistor is increased to lower the tolerance of inrush current. If an inrush current may flow, it is necessary to securely release the inrush current suppressing resistor. In the AC-DC converter according to the present embodiment, the inrush current suppressing resistor is released in a state where the absolute value of the input AC voltage is not lower than the output DC voltage and an inrush current may flow. Thus, the AC-DC converter features the use of components with a small current withstand capacity.

In the AC-DC converters according to Embodiments 1 to 3, the switch for short-circuiting the inrush current suppressing resistor may be a semiconductor switch, e.g., the thyristor of the related art example or a relay switch. The position of the parallel circuit of the inrush current suppressing resistor and the switch is not limited to those in Embodiments 1 to 3 and the parallel circuit may be located at any positions on a current path through which the current from the input AC power supply flows to charge the output capacitor and returns to the input AC power supply. At some switch connecting positions, a level shift or insulation transfer is necessary for the driving signal generated in the inrush current suppressing circuit, which is a design matter but is not the essence of the present disclosure. Thus, the detailed explanation thereof and the disclosure of a circuit example are omitted.

In the inrush current suppressing circuit of the AC-DC converter according to Embodiments 1 to 3, the essence of the present disclosure is only the configuration for releasing the inrush current suppressing resistor when the absolute value of the input AC voltage is higher than the output DC voltage. The configuration is one condition for suppressing an inrush current and does not limit the present disclosure. For example, when the condition for starting a system by applying an input AC voltage to a power supply is established in the system and an activation starting signal is input to the power supply, the driving signal of a resistance short-circuiting switch may be the logical AND of the activation starting signal and the driving signal generated in the inrush current suppressing circuit of the present disclosure.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is useful for, for example, a power supply circuit that receives power from an input AC power supply such as a commercial AC power supply and supplies a DC voltage to electronic devices.

What is claimed is:

1. An alternating current-direct current (AC-DC) converter comprising:
    an input AC power supply that outputs an input AC voltage;
    a step-up converter that converts the input AC voltage into an output DC voltage and outputs the output DC voltage from an output capacitor; and
    an inrush current suppressing circuit,
    the inrush current suppressing circuit including:
    an inrush current suppressing resistor provided on a path through which a current from the input AC power supply flows to charge the output capacitor of the step-up converter and returns to the input AC power supply;
    a resistance short-circuiting switch that short-circuits the inrush current suppressing resistor; and
    a control circuit that generates a signal for turning off the resistance short-circuiting switch when an absolute value of the input AC voltage is higher than the output DC voltage.

2. The AC-DC converter according to claim 1,
    wherein the step-up converter includes:
    a full-wave rectifying circuit that full-wave rectifies the input AC voltage;
    a series circuit of an inductor and a step-up switch, the series circuit being connected in parallel with an output of the full-wave rectifying circuit;
    a rectifying/smoothing circuit including a rectifier and the output capacitor, the rectifier rectifying and smoothing a voltage across the step-up switch; and
    a control drive circuit that controls driving of the step-up switch, and
    the control circuit generates the signal for turning off the resistance short-circuiting switch when an input rectified voltage output from the full-wave rectifying circuit is higher than the output DC voltage.

3. The AC-DC converter according to claim 2,
    wherein the control circuit includes:
    an output detection circuit that divides or level-shifts the output DC voltage and then outputs an output detection voltage;
    an input detection circuit that divides or level-shifts the input rectified voltage and then outputs an input detection voltage; and
    a comparator that compares the output detection voltage and the input detection voltage, and
    the control circuit turns off the resistance short-circuiting switch when a voltage difference between the output DC voltage and the input rectified voltage is equal to or smaller than a first reference value.

4. The AC-DC converter according to claim 1,
    wherein the step-up converter includes:
    a first input terminal that receives the input AC voltage from one end of the input AC power supply through an inductor;
    a second input terminal that receives the input AC voltage from another end of the input AC power supply;
    a first series circuit in which a high-side switch and a low-side switch are connected in series, the high-side switch and the low-side switch each being connected to the first input terminal;
    a second series circuit in which a high-side rectifier and a low-side rectifier are connected in series, the high-side rectifier and the low-side rectifier each being connected to the second input terminal;
    a control drive circuit that controls driving of the high-side switch and the low-side switch; and
    the output capacitor connected in parallel with the first series circuit and the second series circuit, and
    the control circuit generates a signal for turning on the resistance short-circuiting switch when the one end of the input AC power supply has a potential between a ground potential of the step-up converter and the output DC voltage.

5. The AC-DC converter according to claim 4,
    wherein the control circuit includes:
    an output detection circuit that divides or level-shifts the output DC voltage and then outputs an output detection voltage;
    an input detection circuit that divides or level-shifts a potential of one end of the input AC power supply and then outputs an input detection voltage;
    a first comparator that compares the input detection voltage and the ground potential of the step-up converter; and
    a second comparator that compares the input detection voltage and the output detection voltage, and
    the control circuit turns off the resistance short-circuiting switch when a voltage difference between the output DC voltage and the potential of the one end of the input AC power supply is equal to or smaller than a first reference value and a voltage difference between the output detection voltage and the ground potential of the step-up converter is equal to or smaller than the first reference value.

6. The AC-DC converter according to claim 1,
    wherein the step-up converter includes:
    a first input terminal that receives the input AC voltage from one end of the input AC power supply through a first inductor;
    a second input terminal that receives the input AC voltage from another end of the input AC power supply through a second inductor;
    a first series circuit in which a first high-side rectifier and a first switch are connected in series, the first high-side rectifier and the first switch being connected to the first input terminal;
    a second series circuit in which a second high-side rectifier and a second switch are connected in series, the second high-side rectifier and the second switch being connected to the second input terminal;

a control drive circuit that controls driving of the first switch and the second switch;

the output capacitor connected in parallel with the first series circuit and the second series circuit;

a first low-side rectifier connected between a node between the first switch and the second switch and the one end of the input AC power supply; and a second low-side rectifier connected between the node between the first switch and the second switch and the other end of the input AC power supply, and the control circuit generates a signal for turning on the resistance short-circuiting switch when potentials of the one end and the other end of the input AC power supply are both lower than the output DC voltage.

7. The AC-DC converter according to claim 6, wherein the control circuit includes:

an output detection circuit that divides or level-shifts the output DC voltage and then outputs an output detection voltage;

a first input detection circuit that divides or level-shifts a potential of one end of the input AC power supply and then outputs a first input detection voltage;

a second input detection circuit that divides or level-shifts a potential of another end of the input AC power supply and then outputs a second input detection voltage;

a first comparator that compares the output detection voltage and the first input detection voltage; and a second comparator that compares the output detection voltage and the second input detection voltage, and the control circuit turns off the resistance short-circuiting switch when a voltage difference between the output DC voltage and the potential of the one end of the input AC power supply is equal to or smaller than a first reference value and a voltage difference between the output detection voltage and the potential of the other end of the input AC power supply is equal to or smaller than the first reference value.

* * * * *